J. Urmy.
Harvester Rake.
Nº 16941 — Patented Mar. 31, 1857.
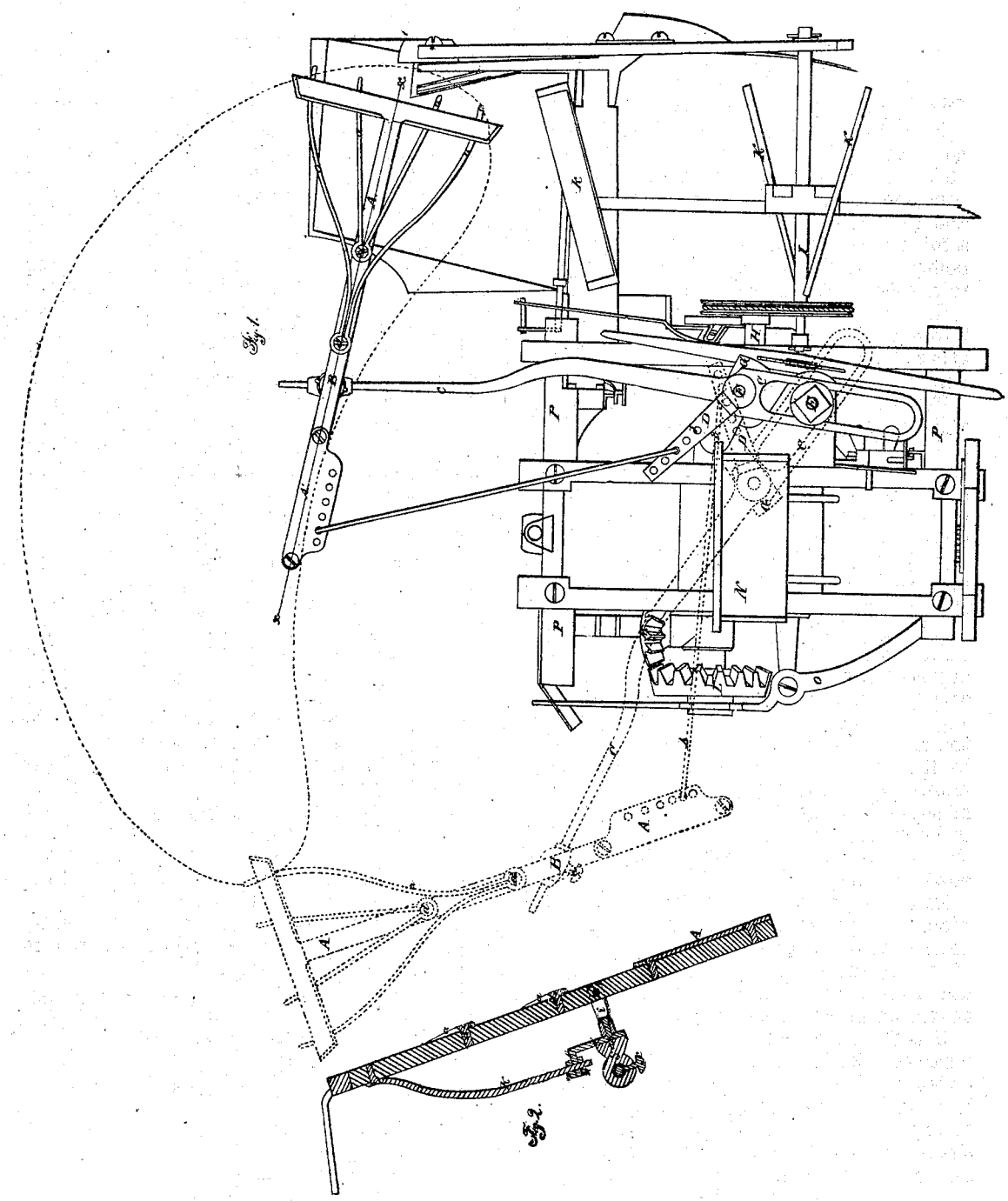

UNITED STATES PATENT OFFICE.

JESSE URMY, OF WILMINGTON, DELAWARE.

IMPROVED RAKING APPARATUS FOR HARVESTERS.

Specification forming part of Letters Patent No. 16,941, dated March 31, 1857.

*To all whom it may concern:*

Be it known that I, JESSE URMY, of Wilmington, county of New Castle, in the State of Delaware, have invented new and useful Improvements in Rakes of Harvesting-Machines; and I do hereby declare that the following is a full and exact description thereof, reference being had to the accompanying drawings, and to the letters of reference marked thereon.

The nature of my invention consists in an improved arrangement or mechanism for operating the rake of harvesting-machines &c., as hereinafter described.

To enable those skilled in the art to make and use my invention, I will proceed to describe its construction and operation.

In the accompanying drawings, Figure 1 represents a top view of a harvesting-machine with my improvement attached, and Fig. 2 a section of the rake at $x\ x$, Fig. 1.

A is the rake, of which the wires $a\ a$, &c., form the teeth, and which is pivoted at $e$ to the standard $i$. Said rake is adjusted on the pivot $e$ and secured in the relative position required with the standard $i$ by means of the adjustable brace-rod $k$, passing through the arm $l$, to which it is secured by nuts $n\ n$. (See Fig. 2.) The standard $i$, to which is secured the rake, is swiveled or pivoted to the dog $s$ by the screw or bolt $r$, whereby said rake is allowed to swing or revolve upon its center or point B in any plane required, which plane is determined by the position of the dog $s$ on the rake-bar C, to which bar said dog is fastened by the screw $c$.

To the upper end of rake A is attached a plate, A′, furnished with holes $v\ v$, &c., to accommodate the connecting-rod $b$, and by means of which and holes $y\ y$, &c., in the crank D the throw of the rake or motion is regulated as circumstances may require.

G is the main crank on the upper end of the vertical shaft which is driven by the main wheel, as others of the same character. On said crank is a stud, F, projecting upward and through the rake-bar C. The rear end of said bar is slotted and works around the stationary stud E. By the revolution of the crank-pin F around the center of the vertical shaft, while the slotted end of the rake-bar works around the stationary pin E, the prime motion of the rake is produced, or the required motion for the center point, B, of the rake, or for the dog $s$; but this motion, not being all that is desired for the raking operation, is resolved into the required motion by means of the plate A′ being connected to the crank-rod D by means of rod $b$, said crank-bar being secured to the crank-pin F and set at the proper angle with the main crank G, as seen at Fig. 1. The ratios of the two before-described motions are varied by shifting the connecting-rod $b$ in the holes $v\ v$, &c., and holes $y\ y$, &c. The red dotted line in Fig. 1 approximates the line of motion of one of the teeth of the rake when adjusted as seen in the drawings.

P P, &c., represent the frame-work of my improved harvester, I the reel-shaft, K K the arms, &c., of which no description is here required, as I contemplate embracing the improvements in said machine in another application.

I am aware that rakes have been constructed and operated with a rake-bar similar to mine, driven by a crank, and having its rear end working around a stationary stud, and I do not lay any claim to such an arrangement.

I am also aware that the upper end of the rake-bar has been governed by a connecting-rod attached to a stationary point or fulcrum, and do not therefore wish to be understood as laying claim to any such arrangement; but What I do claim as my invention, and desire to secure by Letters Patent, is—

Operating the rear end of the rake A by means of a crank, D, when said crank moves with the pin that operates the rake-bar C, in combination with the connecting-rod $l$ and adjusting-holes $v\ v$ and $y\ y$, the whole being constructed and arranged in the manner and for the purpose set forth.

JESSE URMY.

Witnesses:
NATHANIEL HAYES,
ABRAHAM GRANTS.